(12) United States Patent
Sherkin et al.

(10) Patent No.: US 8,341,715 B2
(45) Date of Patent: Dec. 25, 2012

(54) SYSTEM AND METHOD FOR SHARED RESOURCE OWNER BASED ACCESS CONTROL

(75) Inventors: Alexander Sherkin, Newmarket (CA); Bryan Goring, Milton (CA); Laura Doktorova, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 871 days.

(21) Appl. No.: 12/040,122

(22) Filed: Feb. 29, 2008

(65) Prior Publication Data

US 2009/0222903 A1 Sep. 3, 2009

(51) Int. Cl.
*G06F 21/00* (2006.01)
(52) U.S. Cl. ............ 726/10; 726/7; 380/270; 713/168; 713/169; 713/170; 713/171; 713/187
(58) Field of Classification Search .......... 713/168–171, 713/187; 726/7, 10; 380/270
See application file for complete search history.

(56) References Cited

U.S. PATENT DOCUMENTS

| | | | | |
|---|---|---|---|---|
| 5,991,399 | A * | 11/1999 | Graunke et al. | 380/279 |
| 6,138,235 | A * | 10/2000 | Lipkin et al. | 713/155 |
| 6,279,111 | B1 * | 8/2001 | Jensenworth et al. | 726/10 |
| 6,615,350 | B1 * | 9/2003 | Schell et al. | 713/168 |
| 7,353,515 | B1 * | 4/2008 | Ton et al. | 718/102 |
| 2005/0005112 | A1 * | 1/2005 | Someren | 713/167 |
| 2005/0246524 | A1 | 11/2005 | Brownell et al. | |
| 2007/0254630 | A1 * | 11/2007 | Moloney et al. | 455/410 |

FOREIGN PATENT DOCUMENTS

| | | |
|---|---|---|
| WO | WO 99 64948 A | 12/1999 |
| WO | WO 01 63385 A | 8/2001 |

OTHER PUBLICATIONS

Carl M Ellison Cybercash et al: Mar. 13, 1998 "simple Public Key Certificate" p. 17, para 4.3.

* cited by examiner

*Primary Examiner* — Kambiz Zand
*Assistant Examiner* — Tongoc Tran
(74) *Attorney, Agent, or Firm* — Gowling Lafleur Henderson LLP

(57) ABSTRACT

Method and system for controlling application access to a shared resource in a runtime environment. The shared resource is owned by a remote resource owner. An access control ticket including a permission for the shared resource, a cryptographically verifiable remote resource owner identifier and a cryptographically verifiable application owner identifier are generated. The access control ticket is approved and signed by the remote resource owner, and transmitted to the runtime environment. The application, when executed in the runtime environment, accesses the resource based on the permission.

25 Claims, 11 Drawing Sheets

SYSTEM AND METHOD FOR SHARED RESOURCE OWNER BASED ACCESS CONTROL

The present patent disclosure relates generally to a communications system for providing communications to a plurality of devices and specifically to a system and method for shared resource owner based access control.

BACKGROUND

Due to the proliferation of wireless devices in use today, there is a continually increasing number of wireless networks. These wireless devices include mobile telephones, wireless personal digital assistants (PDAs), and other wireless multi-functional gadgets. Concurrently with the increase of available wireless devices, software applications running on such devices have increased their utility and complexity. For example, a wireless device may include an application that retrieves a weather report for a list of desired cities or an application that allows a user to bank online. These software applications take advantage of the ability to transmit data of the wireless network in order to provide timely and useful services to users, often in addition to voice communication.

A wireless device generally includes a runtime environment in which an application resides. A process is generally an instance of the application when executed in the runtime environment. The runtime environment generally includes one or more resources. A resource is generally a physical or a virtual component that can be accessed by a process. A resource may be accessed by more than one processes and thus is shared by these processes. However, not every process in the runtime environment should have the privilege to access every resource in the runtime environment. For security reasons, access to shared resources in runtime environment should be controlled.

Access control rules are generally defined within the runtime environment for the resources, by a user who has direct access to the runtime environment. For example, a user of a computer usually decides the access control rules on his computer. Therefore, access control rules for a runtime environment generally can only be defined by the user who has access to the runtime environment.

This approach has some significant limitations. The user of a runtime environment usually does not have enough information to properly specify access control rules for resources. The problem is compounded for shared resources, where a plurality of processes executing their respective applications. The user may not even be aware which processes should be given the privilege to access the resources in the respective access control rules.

In certain situations it may be desirable to specify the access control rules by an entity other than the user of the runtime environment. The need arises more prominently for runtime environments on the wireless devices. For example, a bank may create a library for a wireless device. The bank expects to have an exclusive right to control access to this library at runtime on all wireless devices suitable to run the library.

Therefore there is a need for a method and a system for shared resource access control that is suitable for runtime environments in distributed and/or wireless systems.

BRIEF DESCRIPTION OF THE DRAWINGS

An embodiment of the patent disclosure will now be described by way of example only with reference to the following drawings in which.

DETAILED DESCRIPTION OF PREFERRED EMBODIMENTS

Figure 1:
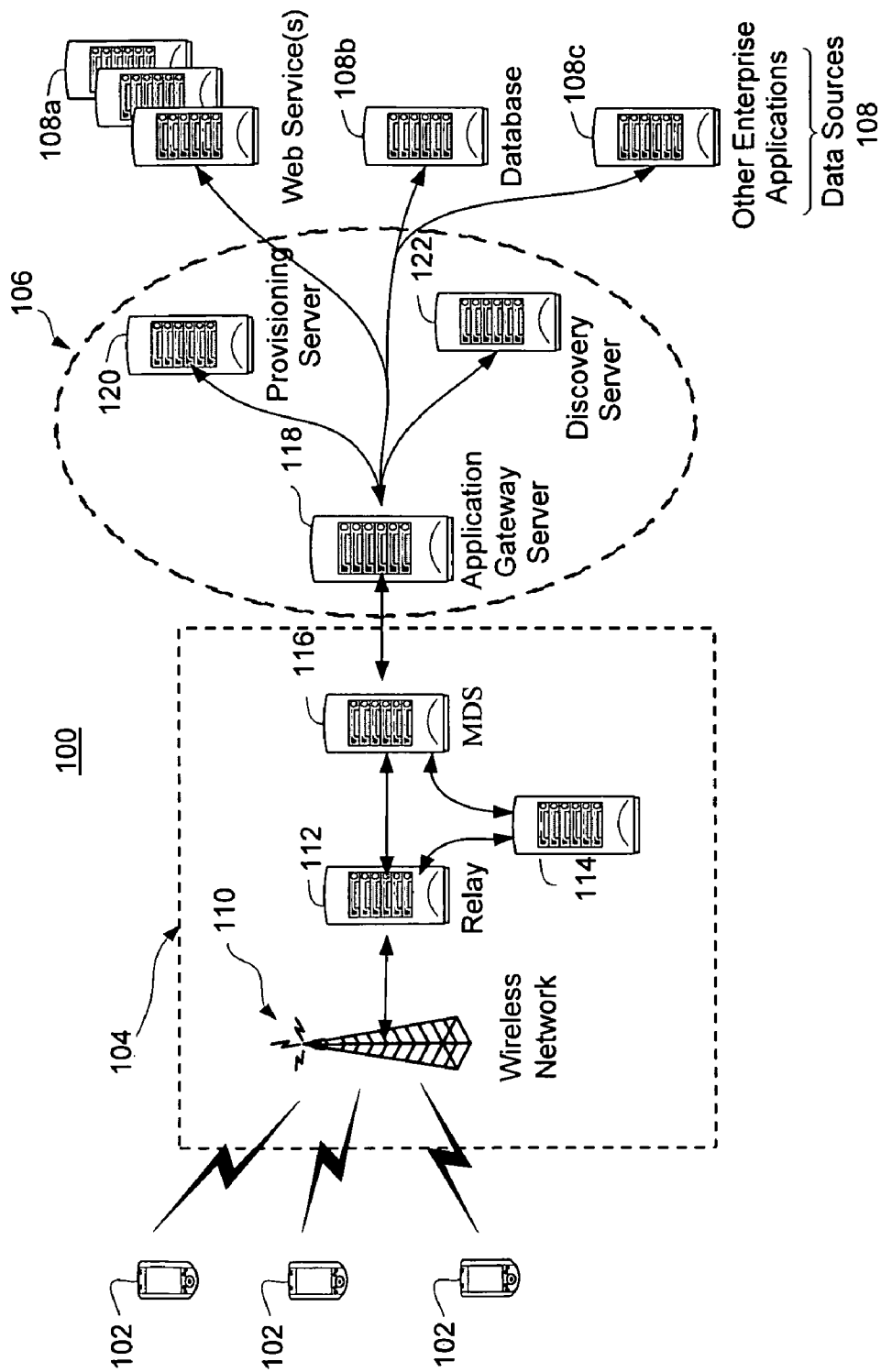
FIG. 1 shows an example of a network facilitating wireless component applications in a schematic diagram.

The patent disclosure provides a system and method for shared resource owner based access control.

In accordance with an embodiment of the present patent disclosure there is provided a method for controlling an access to a resource, the method comprising the steps of: providing a runtime environment, the runtime environment having an application and a shared resource, the shared resource owned by a remote resource owner; generating an access control ticket, the access control ticket including a permission for the shared resource, a first cryptographically verifiable owner identifier identifying the remote resource owner and a second cryptographically verifiable owner identifier identifying the application owner; approving the access control ticket by the remote resource owner; signing the shared resource or the application with a private key, resulting in a signature verifiable with a public key corresponding to the private key; transmitting the access control ticket to the runtime environment, and executing the application in the runtime environment resulting in a process, the process accessing the shared resource based on the permission.

Preferably, the runtime environment is on a wireless device.

Preferably, the method further comprises the step of providing the access control ticket to a plurality of runtime environments having the shared resource.

In accordance with another embodiment of the present patent disclosure there is provided a wireless device comprising: a runtime environment, the runtime environment having an application and a shared resource, the shared resource owned by a remote resource owner; a module receiving an access control ticket, the access control ticket including a permission for the shared resource, a first cryptographically verifiable owner identifier identifying the remote resource owner and a second cryptographically verifiable owner identifier identifying the application owner; the access control ticket approved by the remote resource owner; and a module executing the application in the runtime environment resulting in a process, the process accessing the shared resource based on the permission, wherein the shared resource or the application is signed with a private key, resulting in a signature verifiable with a public key corresponding to the private key and wherein the access control ticket is signed.

Preferably, the first cryptographically verifiable owner identifier or the second cryptographically verifiable owner identifier is the public key or an X509 name.

Preferably, the public key and the X509 name is associated and attested by a certificate.

Preferably, the access control ticket further includes a first identifier identifying the shared resource in the runtime environment, and a second identifier identifying the application in the runtime environment.

Preferably, the first identifier is a URI or a hash value of the shared resource.

Preferably, the second identifier is a URI or a hash value of the application.

Preferably, the access control ticket is created by an owner of the application and approved by the remote resource owner.

Preferably, the access control ticket is created by an owner of the shared resource and approved by the resource owner.

Preferably, the application owner is a remote application owner.

Preferably, the access control ticket is sent through an unsecured link from the remote resource owner to the runtime environment.

Preferably, the access control ticket is included with the application or the shared resource.

Preferably, the access control ticket is provided to a plurality of runtime environments having the shared resource.

Preferably, the first owner identifier or the second owner identifier is anonymous, and the permission is granted to all applications.

Reference will now be made in detail to some specific embodiments of the patent disclosure. Examples of these specific embodiments are illustrated in the accompanying drawings. While the disclosure is described in conjunction with these specific embodiments, it will be understood that it is not intended to limit to the described embodiments. On the contrary, it is intended to cover alternatives, modifications, and equivalents as may be included within the spirit and scope of the patent disclosure. In the following description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this patent disclosure belongs.

The term "application" is intended to describe a collection of computer executable instructions. Different types of application are envisioned in the embodiments of the present patent disclosure, for example but not limited to, mobile data server (MDS) applications, Java applications, or other executable set of instructions.

The term "process" is intended to describe an instance of an application that is being executed, for example, in a runtime environment.

The term "resource" is intended to describe a physical or a virtual component that can be accessed by a process. Different types of resources are envisioned in the embodiments of the present patent disclosure, for example but not limited to, shared data, runtime environment plug-ins, application entry points, etc.

The term "runtime environment" is intended to describe an environment in which processes are executed. Runtime environment generally provides software services for processes executed by the environment. Runtime environment, for example, facilitates process access to various resources.

The term "shared resource" is intended to describe a resource that may be accessed by more than one process in runtime environment. Examples of shared resources may include, but not limited to: common scripts, common screens, common library, shared data, and common plug-ins.

The term "Cryptographically Verifiable Object Identifier" (CVOID) is used to describe an identifier associated with an object such that given an object and the associated CVOID, a party would be able to verify authenticity of the association with a certain degree of reliability.

The term "access control ticket" is intended to describe a document that specifies who can access what and what the permissions are.

FIG. 1 and the following discussion are intended to provide a brief general description. FIG. 1 illustrates a block diagram of a suitable communication infrastructure 100 in which a preferred embodiment of the present patent disclosure may be implemented. The communication infrastructure 100 comprises a plurality of wireless devices 102, a communication network 104, an application gateway 106, and a plurality of back-end services 108.

The wireless devices 102 are typically personal digital assistants (PDAs), but may include other devices. Each of the wireless devices 102 includes a runtime environment capable of hosting a plurality of component applications.

The wireless devices 102 are in communication with the application gateway 106 via the communication network 104. Accordingly, the communication network 104 may include several components such as a wireless network 110, a relay 112, a corporate server 114 and/or an MDS 116 for relaying data between the wireless devices 102 and the application gateway 106.

The application gateway 106 may comprise a gateway server 118, a provisioning server 120 and a discovery server 122. The gateway server 118 generally acts as a message broker between the runtime environment on the wireless devices 102 and the back-end services 108. The gateway server 118 may be in communication with both the provisioning server 120 and/or the discovery server 122. The provisioning server 120 and the discovery server 122 generally provide enterprise services. The gateway server 118 may further be in communication with a plurality of the back-end services 108, such as Web services 108a, database services 108b, as well as other enterprise services 108c, via a suitable link. For example, the gateway server 118 may be connected with the Web services 108a and database services 108b via Simple Object Access Protocol (SOAP) and Java Database Connectivity (JDBC), respectively. Other types of back-end services 108 and their corresponding links can be connected to the gateway server 118.

Preferably, each wireless device 102 is initially provisioned with parameters to establish various protocols and settings, including connectivity information for the corporate server 114 and/or the mobile data server 116. These parameters may include a uniform resource locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
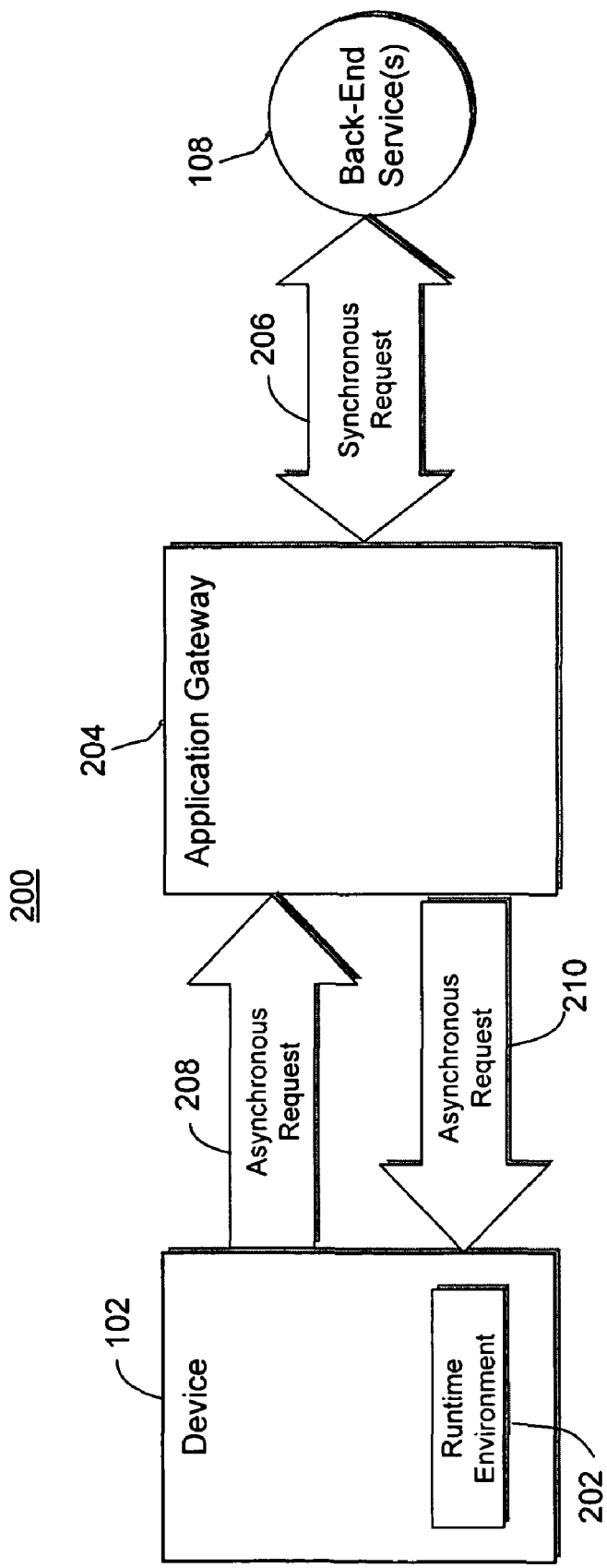
FIG. 2 shows an example of a wireless component application communication model in a flow diagram.

Referring to FIG. 2 there is illustrated in a block diagram an example of a wireless component application communication infrastructure 200. The overall wireless component application infrastructure 200 generally includes a wireless component application runtime environment (RE) 202 running on the wireless device 102 and a wireless component application gateway (AG) 204 running on the server 118.

Component applications generally comprise one or more data components, presentation components, and/or message components, which may generally be written in a structured definition language such as Extensible Markup Language (XML) code. The component applications may further comprise workflow components which contain a series of instructions, and may be embedded in the XML code. Therefore, since the applications are compartmentalized, a common application can be written for multiple devices by providing corresponding presentation components without having to rewrite the other components. Further, large portions of the responsibility of typical applications are transferred to the runtime environment for component application.

The application gateway 204 serves as a mediator between a wireless component application executed by the runtime environment 202 and one or more back-end services 108 with which the application communicates. Often the back-end service is expected to be a Web service 108a using SOAP over HTTP or HTTPS as the transport protocol. As Web services are the commonly expected back-end service 108, the term Web service is used interchangeable with back-end service 108 throughout this disclosure. However, it should be apparent to a person skilled in the art that other types of back-end services can also be adapted to the disclosure. FIG. 2 shows a synchronous link 206 between the application gateway 204 and the back-end service 108. However, it should be appreciated by a skilled artisan that the application gateway 204 can be in communication with back-end services 108 over asynchronous links. In the non-limiting example shown in FIG. 2, the requests 208, 210 between the wireless device 102 and the application gateway 204 are sent asynchronous.

The wireless component application communication architecture 200 is generally based upon an asynchronous messaging paradigm. In this communication architecture 200 the application gateway 204 establishes and mediates the connection between the device 102 and the back-end service(s) 108 to:

1. Achieve greater flexibility in resource management.
2. Provide reliable communication link between device 102 and back-end service 108 to handle situations when wireless coverage is unstable.
3. Efficiently distribute workload between device runtime environment 202 and application gateway 204.

Figure 3:
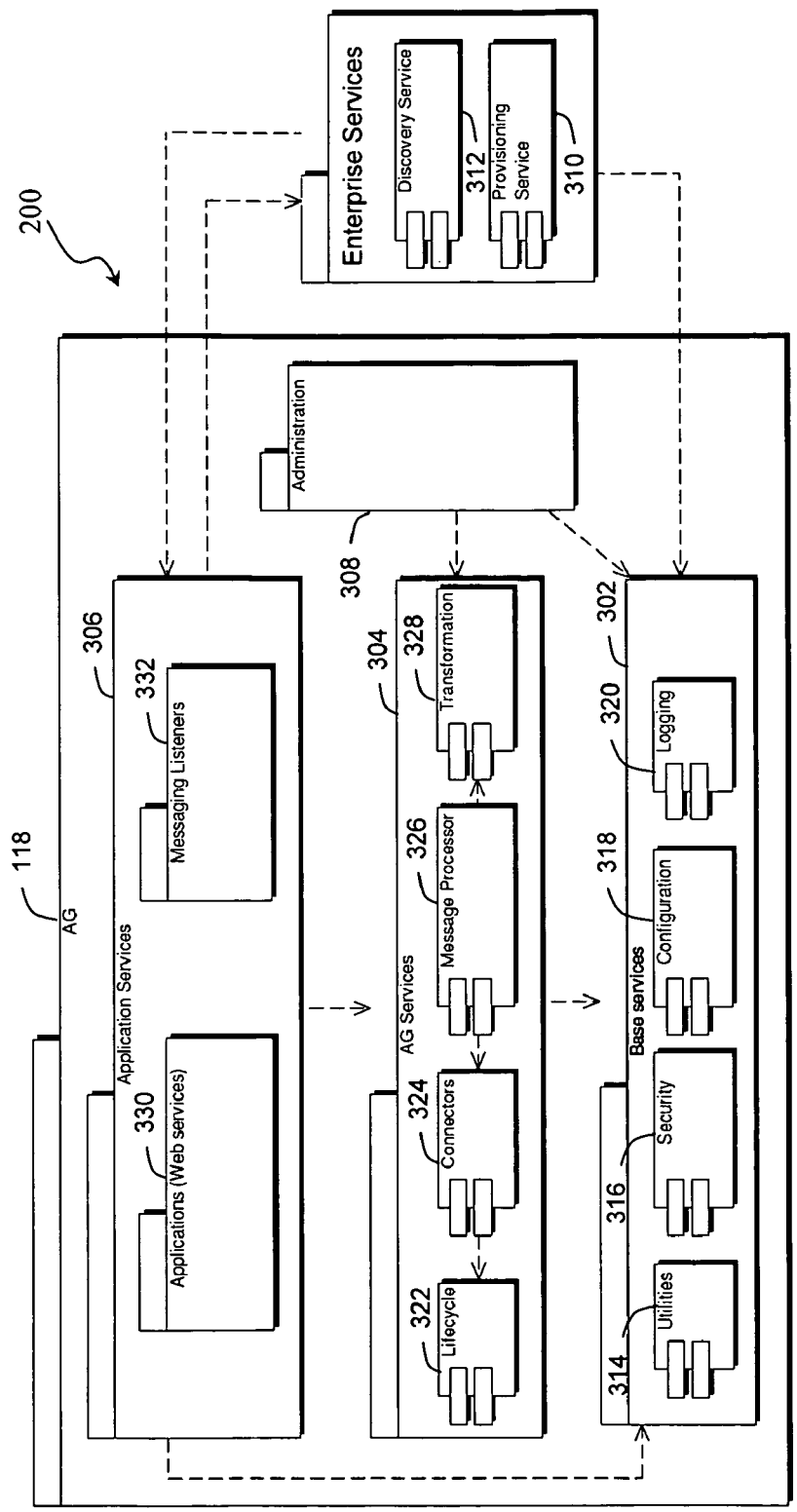
FIG. 3 shows an example of the application gateway shown in FIG. 1 in a detailed component diagram.

FIG. 3 shows a more detailed view of an exemplary application gateway 200. The application gateway server 118 generally includes three layers of service; a base services layer 302, an application gateway services layer 304 and an application services layer 306. The application gateway server 118 further includes an administration service 308.

A provisioning service 310 and a discovery service 312 are provided by the provisioning server 120 and discovery server 122, respectively.

At the lowest level, the base services layer 302 offers basic, domain-independent system services to other subsystems in higher levels. Thus, for example, all subsystems in the application gateway services layer 304 and the application services layer 306 can utilize and collaborate with the subsystems in the base services layer 302. In the present embodiment, the base services layer 302 includes a utilities subsystem 314, a security subsystem 316, a configuration subsystem 318, and a logging subsystem 320.

The application gateway services layer 304 provides wireless component application domain-specific services. These services provide message transformation and delivery to back-end services 108 and provide wireless device 102 and component application lifecycle management. In the present embodiment, the application gateway services layer 304 includes a lifecycle subsystem 322, a connector subsystem 324, a messaging subsystem 326, and a transformation subsystem 328.

The application services layer 306 provides external program interfaces and user interfaces using subsystems provided by the lower layers. For example, various applications such as a service provider lifecycle application, a packaging application or a message listening application provides external program interfaces since they communicate primarily with applications on external systems. For example, the messaging listening application (or messaging listeners 332) provides an interface for receiving messages from the wireless devices 102 as well as external sources and forwarding them to the messaging subsystem. Further, the message listening application 330 typically authenticates that the source of the message is valid.

Other applications 330 may provide a user interface for accessing and potentially modifying application gateway data and/or parameters.

The administration service 308 is responsible for administrative system messages, administration of the wireless devices 102, runtime administration of the application gateway subsystems, support and display system diagnostics, and administration of default implementations of the provisioning and discovery services.

Figure 4:
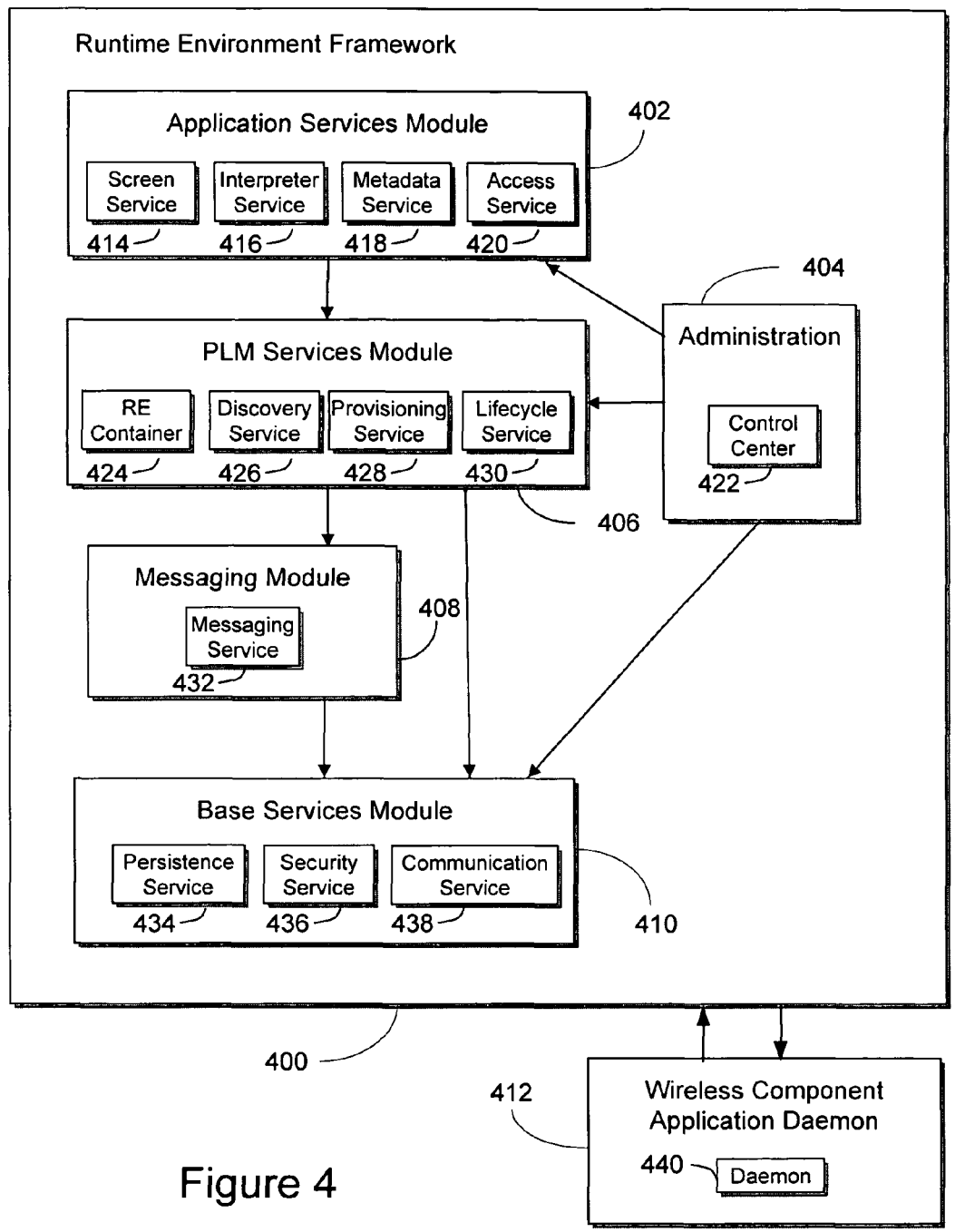
FIG. 4 shows in a component diagram an example of a runtime environment structure.

FIG. 4 shows an example of a runtime environment framework 400. The runtime environment framework 400 comprises an application services module 402, an administration module 404, a provisioning and lifecycle management (PLM) services module 406, a messaging module 408, and a base services module 410.

The application services module 402 may include, for example, a screen service 414 for providing an interface between currently running applications and a user, an interpreter service 416 for providing an execution environment for the applications, a metadata service 418 for handling and mediating application metadata related access, and an access service 420 for allowing applications to access other applications on the device 102.

The administration module 404 may include a control center 422 for handling a user interface of the wireless component application runtime environment framework 400, processing user interaction with the runtime environment framework 400, and for integrating the runtime environment framework 400 with the network system 100.

The PLM services module 406 may include a runtime environment container 424 for coordinating runtime environment container upgrades and backup/restore processes and for implementing a default error handling mechanism for the runtime environment framework 400, a discovery service module 426 for locating applications in an application repository, a provisioning service 428 for application provisioning (including application downloads, installation and upgrades), and a lifecycle service 430 for registering, maintaining information for, and administrating applications.

The messaging module 408 may include a messaging service module 432 for message queuing, message (de)compacting, and message distribution.

The base services module 410 may include a persistence service 434 for storing a runtime environment profile (including version, directory, client administration policy, application administration policies, security keys, available upgrades, etc.), storing an application profile (including version, metadata, application persistence data components, application persistable global data and application resource, available upgrades, etc.), and storing reliable messages (including outgoing messages pending delivery due to out-of-coverage, and incoming reliable messages pending processing). The base services module 410 also includes a security service 436 for restricting access to runtime environment services, providing message authentication, integrity, and encryption. The base services module 410 also includes a communication service 438 for sending and receiving messages in and out of the device 102, downloading resources and files from appropriate repositories, and notifying interested runtime environment services about wireless coverage events.

The runtime environment framework 400 may communicate with a wireless component application daemon 412. The wireless component application daemon module 412 includes a daemon 440 for restarting the wireless component application process whenever it stops due to a fatal exception.

Figure 5:
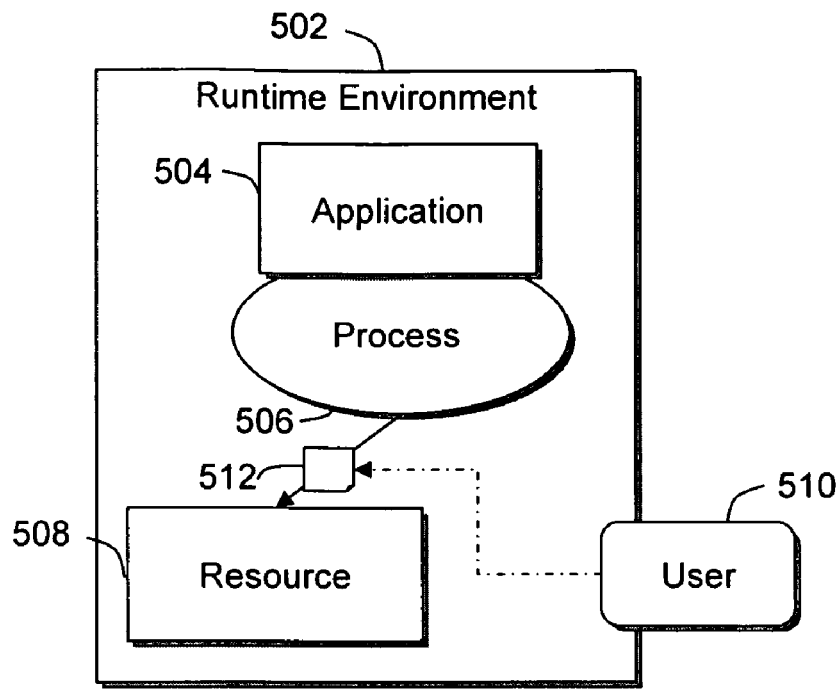
FIG. 5 shows a runtime environment including an application, a process and a resource.

Referring to FIG. 5, a runtime environment 502 including an application 504, for example but not limited to, a mobile data server (MDS) application, a Java application, is shown. An application generally comprises a collection of passive instructions. A process 506 is generally an instance of an application when executed in the runtime environment 502. The runtime environment 502 may include one or more resources 508, for example but not limited to, shared data, runtime environment plug-ins, application entry points. A resource is generally a physical or a virtual component that can be accessed by a process. However, not every process in the runtime environment has the privilege to access every resource in the runtime environment. For security reasons, access to shared resources in runtime environment should be controlled.

Access control rules are generally defined within the runtime environment for the resources, by a user who has direct access to the runtime environment. As illustrated in FIG. 5, the user 510 of the runtime environment 502 defines access control rules 512 for application 504 accessing the resources 508 in run time environment 502. An example would be a user of a computer, who usually decides the access control rules on his computer.

With this conventional approach, access control rules for a runtime environment generally can only be defined by the user who has access to the runtime environment.

Figure 6:
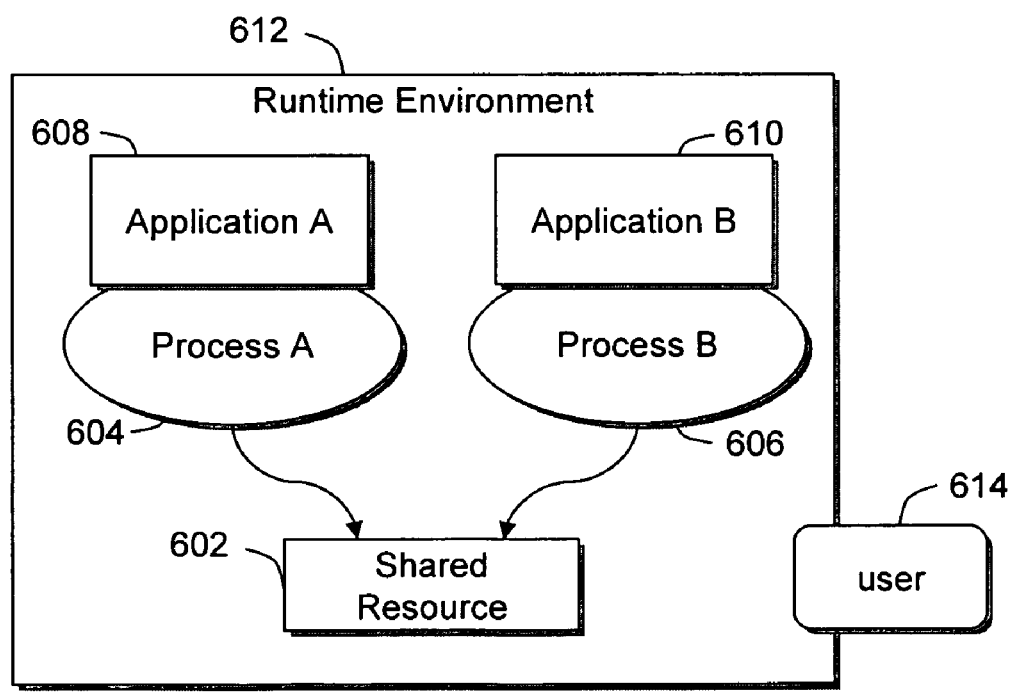
FIG. 6 shows a runtime environment including a plurality of applications.

This approach has some significant limitations. The user of a runtime environment usually does not have enough information to properly specify access control rules for resources. Referring to FIG. 6, this problem is further compounded for shared resources 602, where two processes, process A 604 and process B 606, executing their respective application A, 608 and application B, 610 in a runtime environment 612. In the two examples shown in FIGS. 5 and 6, the user 510 or 614 may not even be aware which processes should be given the privilege to access the resources in the respective access control rules.

Figure 7:
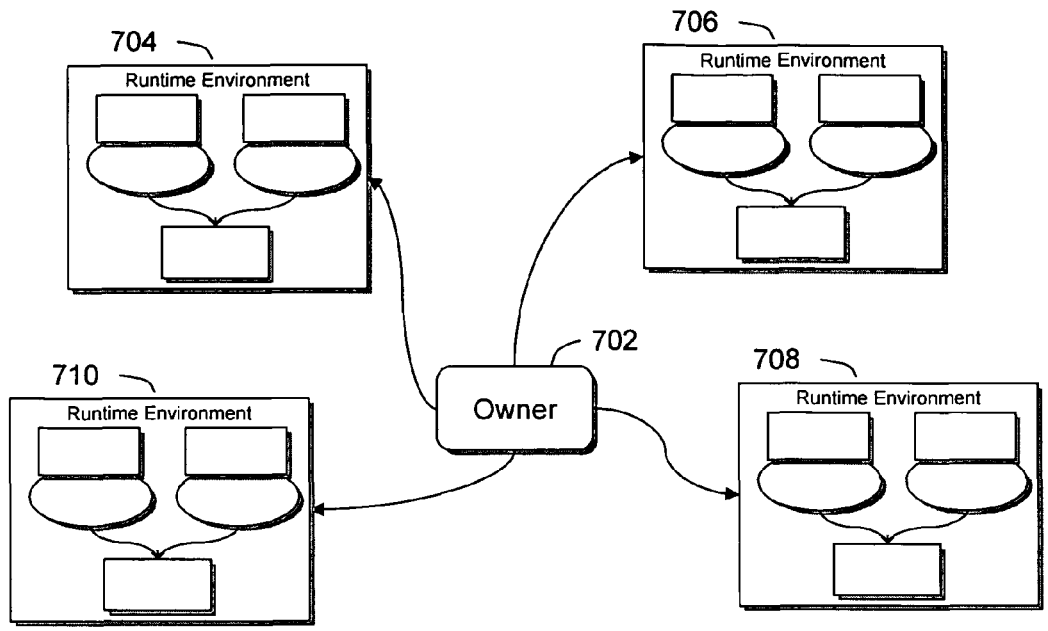
FIG. 7 depicts an owner distributing resources to a plurality of runtime environments.

In certain situations it may be desirable to specify the access control rules by an entity other than the user of the runtime environment. The need arises more prominently for runtime environments running on wireless devices. As illustrated in FIG. 7, an owner 702 may distribute resources to a plurality of runtime environments 704, 706, 708, and 710 and desire to retain the ability to specify the access control rules to these resources. For example, a bank may create a library for a wireless device. The bank expects to have an exclusive right to control access to this library at runtime on all wireless devices suitable to run the library.

In accordance with one embodiment of the present patent disclosure, there is provided a method and a system for shared resource access control that is suitable for runtime environments in distributed systems. The distributed systems may be wireless systems.

Figure 8:
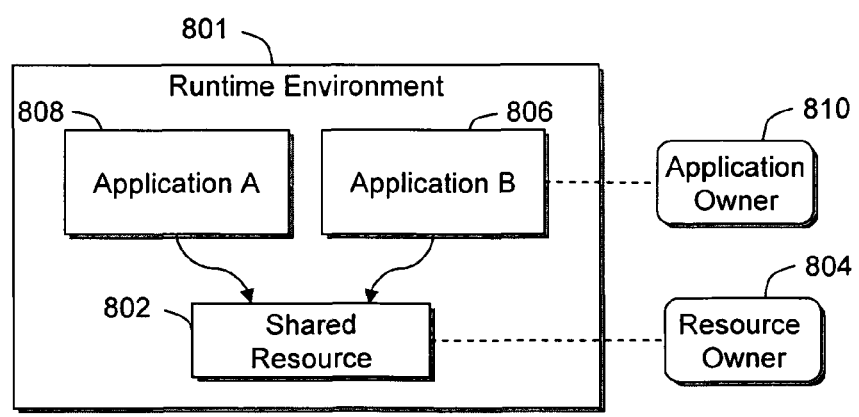
FIG. 8 shows a runtime environment including application and shared resource with their respective owners.

Referring to FIG. 8, a shared resource 802 has a shared resource owner 804. The owner 804 of the shared resource 802 may be, but not limited to, an author or a vendor of the shared resource 802. An application 806 which has a process running in the runtime environment 801 may also have an application owner 810. The owner 810 of the application 806 may also be, but not limited to, an author or a vendor of the application. In FIG. 8 and some following Figures, applications are shown to access the shared resource. However, it should be apparent to a person skilled in the art that in the runtime environment, a process executing instructions of an application actually accesses the shared resource, as for example, illustrated in FIG. 5. Shared resource may generally be any type of identifiable object and can be accessed by one or more applications. Applications may generally be any type of identifiable entity that can access shared resource. It should be apparent to a person skilled in the art that, in a degenerate case, shared object owner and application owner may be the same entity.

In accordance with one embodiment of the present patent disclosure, access to a shared resource is controlled by the shared resource owner. The shared resource access control rules specified and provided by the shared resource owner or application owner apply and approved by the shared resource owner generally to the runtime environment which has the corresponding shared resource deployed. The access control rules will be generally defined and enforced from the shared resource owner in a remote runtime environment. In general, no secure link between the shared resource owner and the runtime environment is required. In other words, access control rules for a shared resource approved by shared resource owner do not need to be securely propagated to every device having the shared resource deployed.

Figure 9:
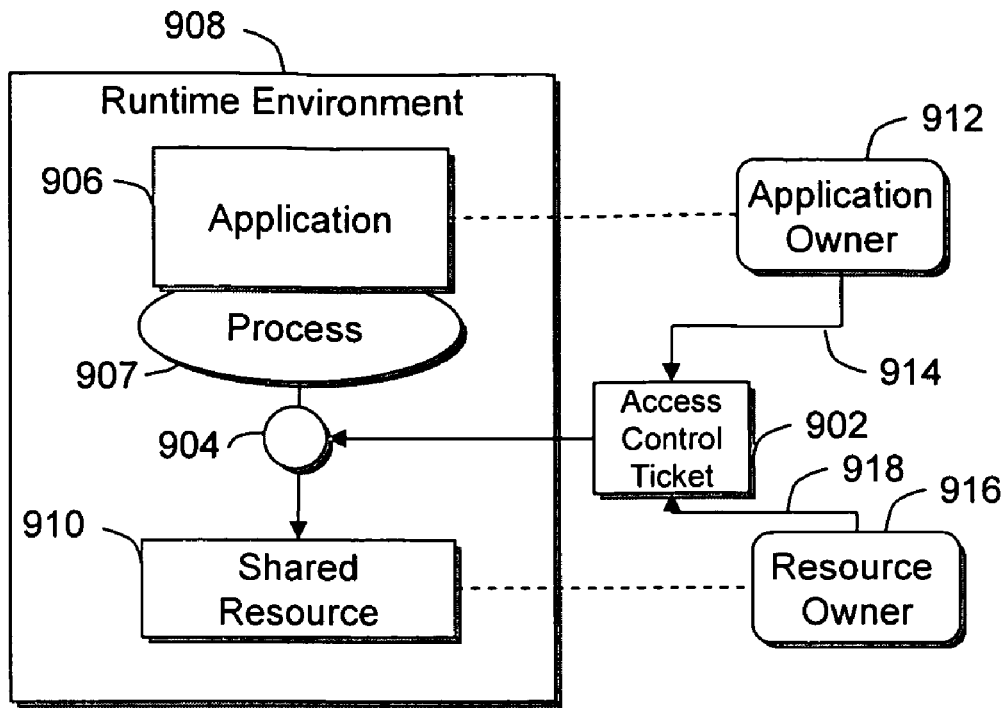
FIG. 9 depicts a shared resource access control model in accordance with an embodiment of the present patent disclosure.

Referring to FIG. 9, a shared resource access control model generally uses an access control ticket 902 to grant access privilege, a non-limiting example of an access privilege would be a permission. In FIG. 9, a permission 904 is granted to an application 906, executing an process 907, in a runtime environment 908 to a shared resource 910 based on the access control ticket 902. The application 906 is owned by the application owner 912, who may, as will be described below, request 914 to access the shared resource 910. The shared resource 910 is owned by the resource owner 916, who generally creates or approves 918 the access control ticket 902.

For example, a bank creates a library for a wireless device and wants only the bank's applications to be able to access the library. The bank issues an access control ticket for the library (shared resource) on the bank's computer, access control to the bank's shared resource will be enforced in all runtime environments that have the shared resource deployed. If another bank creates a second application, an access control ticket for approval is created. When the access control ticket is approved by the resource owner, it is included with the second application.

Figure 10:
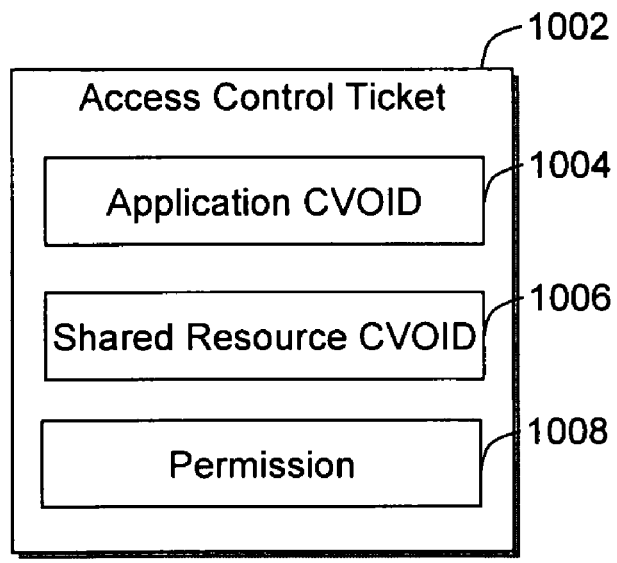
FIG. 10 shows a high level schematic of an access control ticket.

FIG. 10 shows a high level schematic of an access control ticket 1002. Cryptographically Verifiable Object Identifier (CVOID) is an identifier associated with an object such that given an object and the associated CVOID, a party would be able to verify authenticity of the association with a certain degree of reliability. The access control ticket 1002 generally comprises an application CVOID 1004, a shared resource CVOID 1006, and a set of privileges or permissions 1008.

A CVOID generally comprises an object identifier, for example but not limited to, an integer, an URI, or a hash, and a cryptographically verifiable object owner identifier, for example but not limited to an X509 Name or a public key.

Figure 11:
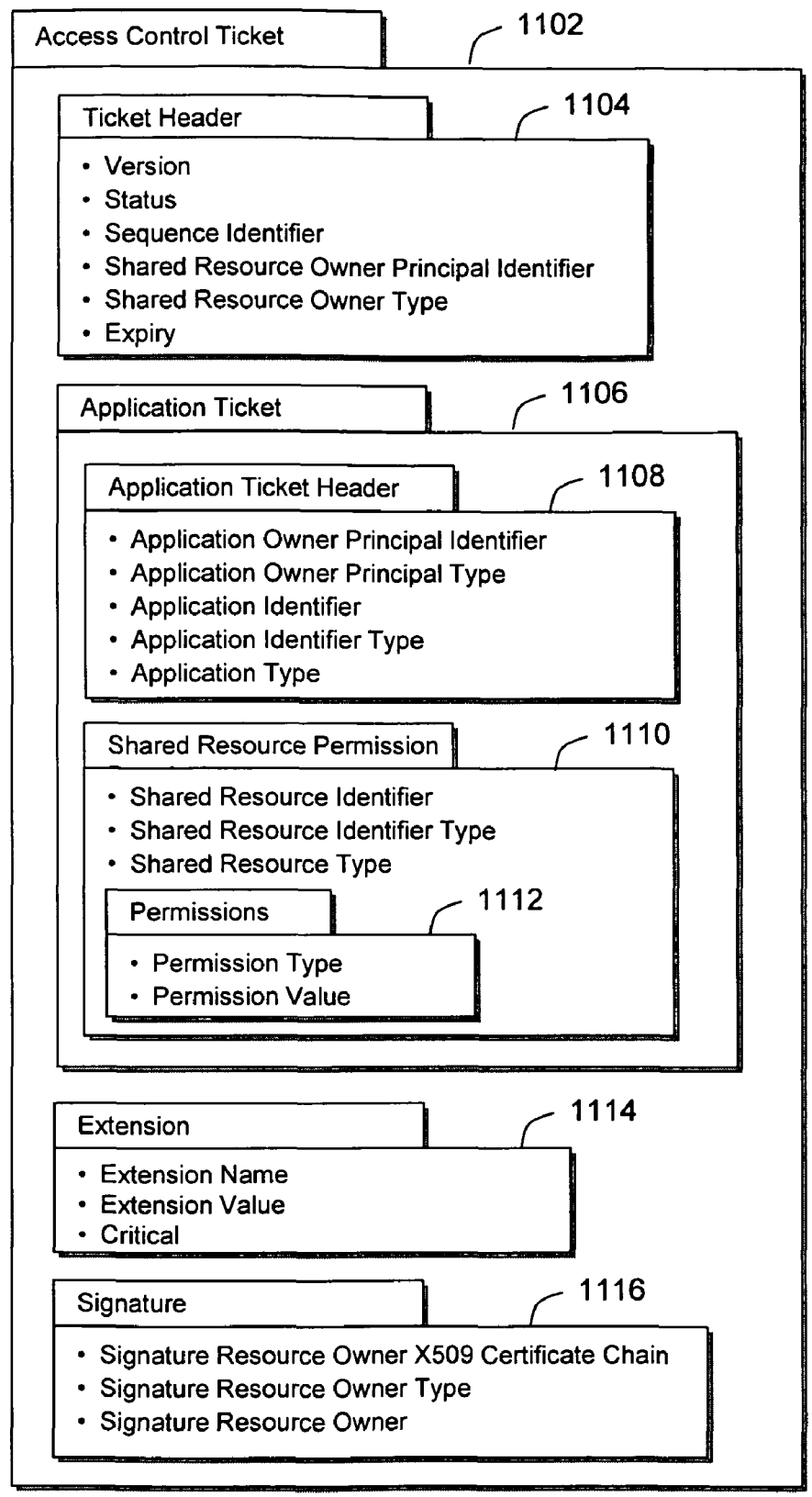
FIG. 11 shows a non-limiting example of an access control ticket.

FIG. 11 shows a non-limiting example of an access control ticket 1102.

The exemplary access control ticket 1102 comprises a Ticket Header 1104, and one or more Application Ticket 1106. The exemplary Access Control Ticket 1102 may further comprise an Extension 1114 and a Signature 1116.

The Ticket Header 1104 includes a Version field, a Status field, a Sequence Identifier field, a Shared Resource Owner Principal Identifier field, a Shared Resource Owner Type field, and an Expiry field.

Figure 12:
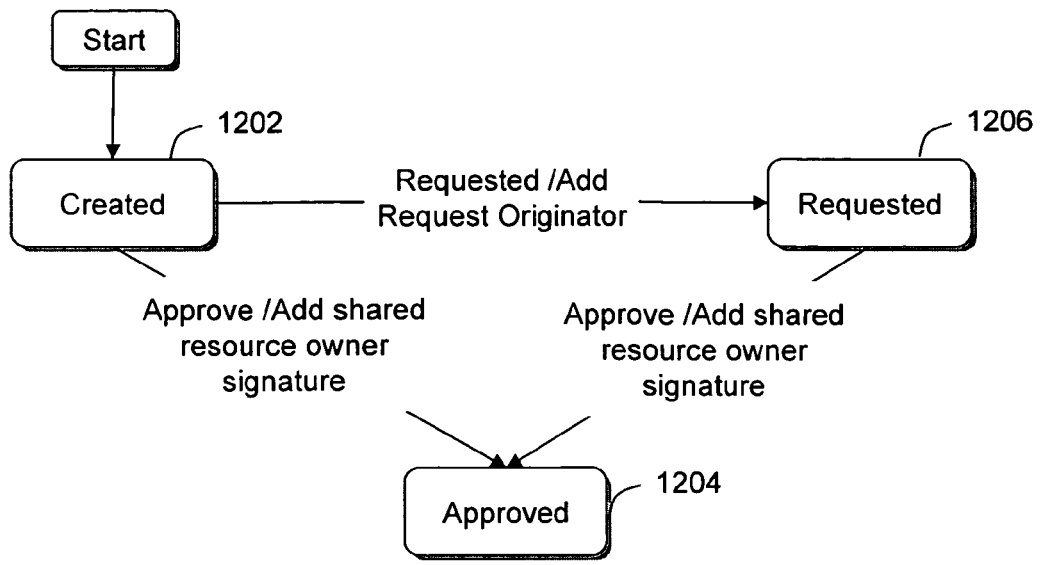
FIG. 12 shows the life cycle of an access control ticket.

The Version field in the Ticket Header 1104 is used to support future versions. The Status of an Access Control Ticket 1102 may be "Created", "Requested" or "Approved". FIG. 12 shows the life cycle of an access control ticket. The access control ticket can generally only be approved by the owner of shared resource.

When an access control ticket is created by an owner of a shared resource or an application, the status is "Created" 1202. The created access control ticket can be approved by the owner of the shared resource, in which case the status of the access control ticket becomes "Approved" 1204.

Alternatively, a created ticket can be sent to the shared resource owner by a requester, for example, the owner of an application, for permission to access the shared resource, in which case ticket status becomes "Requested" 1206. A requested ticket can be approved by the owner of the shared resource in which case the status of the access control ticket becomes "Approved" 1204.

Sequence Identifier field identifies the sequence of the access control ticket. Null means the sequence is not specified. Sequence Identifier may be used for ticket revocation mechanism if implemented.

Owners for shared resources are identified by Shared Resource Owner Principal Identifiers. Shared Resource Owner Principal Identifiers can be of different types. For example, Shared Resource Owner Principal Identifiers can be X509 Name or public key. The public key is used here as a form of identification.

Figure 13:
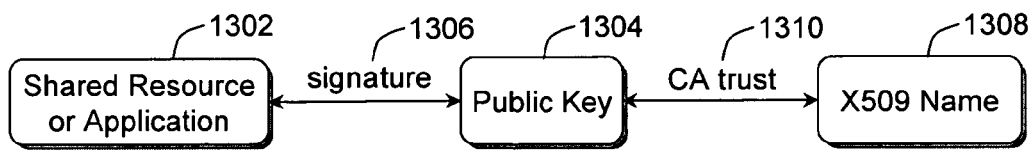
FIG. 13 illustrates association between a shared resource and a public key and an association between a public key and a name.

A digital signature generally provides authentication through two algorithms, one for signing a document which involves the signer's private key, and one for verifying signatures which involves the signer's public key, by accepting or rejecting the signed document. As shown in FIG. 13, the association between a shared resource or application 1302 and a public key 1304 is verified by verifying the signature 1306. On the other hand, the public key's 1304 association to X509 Name 1308 is verified by a certification authority (CA) trust 1310.

In public key infrastructure (PKI), the association between the public key and the owner is attested by a digital certificate issued by the CA. The digital certificate is an electronic document which incorporates a digital signature produced by a certification authority to bind together a public key with an identity, such as the X509 name of the owner.

The certificate can be used to verify that a public key belongs to an individual. When shared resource owner principal is identified by X509 Name, the shared resource owner should have an X509 certificate signed by trusted certification authority and prove possession of the corresponding private key by producing signatures using the private key that corresponds to the public key specified in the X509 certificate, to prove its association with the X509 Name. When shared resource owner principal is identified by public key, the shared resource owner should prove possession of the corresponding private key by producing signatures using the private key that corresponds to the public key, to prove its association with the public key.

Certificates using PKI scheme may be advantageous for large-scale public-key cryptography. Securely exchanging secret keys amongst users of a large network, for example, a wireless network become increasingly impractical as the networks grow. However, using public key as an identifier provides a cost effective alternative to the certificate.

Shared Resource Owner Principal Identifiers field generally includes the value corresponding to the type as specified in the Shared Resource Owner Principal Identifiers Type field.

The Ticket Header 1104 may include an Expiry field to invalidate the access control ticket after the expiry.

The Application Ticket 1106 includes an Application Ticket Header 1108 and a Shared Resource 1110.

The Application Ticket Header 1108 includes an Application Owner Principal Identifierfield, an Application Owner Principal Identifier Type field, an Application Identifier field, an Application Identifier Type field, and an Application Type field.

The Application Owner Principal Identifier Type in the Application Ticket Header 1108 may be, for example but not limited to, X509 Name or public key. Similar to the Shared Resource Owner Principal Identifier described above, when application owner principal is identified by X509 Name, the application owner should have an X509 certificate signed by trusted certification authority and prove possession of the corresponding private key by producing signatures using the private key that corresponds to the public key specified in the X509 certificate, to prove its association with the X509 Name. When application owner principal is identified by public key, the application owner should prove possession of the corresponding private key by producing signatures using the private key that corresponds to the public key, to prove its association with the public key.

An application, for which a permission is specified, is identified by the Application Identifiers. The type of an Application Identifier is specified in Application Identifier Type field. For example but not limited to, an application may be identified by using URI or the hash value of the application.

The Application Type field in the Application Ticket Header 1108 indicates the type of the application, for example, but not limited to, MDS application, Java application.

The Shared Resource Permissions 1110 includes a Shared Resource Identifier, a Shared Resource Identifier Type, a Shared Resource Type, and Permissions 1112.

The shared resource, for which a permission is specified, is identified by the Shared Resource Identifiers. Similar to the Application Identifier, the type of an Shared Resource Identifier is specified in Shared Resource Identifier Type field. For example but not limited to, shared resource may be identified by using URI or the hash value of the shared resource. Shared Resource Type indicates the type of the shared resource, for example but not limited to shared data, runtime environment plug-ins, or application entry points.

The Permissions 1112 specify a permission type, and a permission value. Permission Type can be Access_Type, then the value will be Read/Write/Read_Write in case of shared data. Permission Type can be Allow_Execution, the value will be Yes/No in case of a shared plugin. Permission Type can be Control_Type, the value will be Privileged/User in case of shared data. In privileged mode application can destroy shared data. In user mode, application cannot destroy shared data.

The Access Control Ticket 1102 may further comprise an Extension 1114 which includes an extension name, an extension value, and critical. The extensions may be used for future extensibility. Critical is a Boolean flag which tells whether the extension is critical or not.

The Access Control Ticket 1102 may further include a Signature 1116.

After an Access Control Ticket is approved by an owner of a shared resource, a shared resource owner signature is included. The signature includes a Shared Resource Owner X509 Certificate Chain, and a Shared Resource Owner Type in addition to the Shared Resource Owner Signature.

An X509 permits each certificate to be signed by CA. The CA's certificate may itself be signed by a different CA, all the way up to a root certificate which is available to those who use a lower level CA certificate, forming a X509 certificate chain. In the X509 system, a CA generally issues a certificate binding a public key to a particular Distinguished Name in the X509 tradition, or to an alternative name.

If an Access Control Ticket is requested by an application owner, the requested Access Control Ticket may include an application owner signature for proving the authenticity, in this case the signature includes a Requestor X509 Certificate Chain, and a Requestor Type in addition to the Requestor Signature. A Requestor may generally be an application owner. However, it should be apparent to a person skilled in the art that a access control ticket may be requested by an unrelated party.

Therefore, the Shared Resource Principal Owner Identifier and the Application Principal Owner Identifier as described above create a cryptographically verifiable namespace, so non-verifiable object identifiers such as integers, URI, or hash for Shared Resource Identifier or Application Identifier can be part of this namespace. These non-verifiable object identifiers, on the other hand, differentiate the different objects for the same owner.

Access Control Tickets may be transported to runtime environment with shared resources, with applications, or separately.

It should be apparent to a person skilled in the art that an object can be cryptographically verified in many other ways. For example, but not limited to, as an alternative to the centralized trust model of PKI, a web of trust scheme, whereby the signature is of either the user by using a self-signed certificate or other users through endorsements can be used.

If a shared resource or an application does not have a cryptographically verifiable owner, the shared resource or the application is associated with an anonymous owner.

Permissions generally cannot be granted to applications associated with an anonymous owner. If it is desirable to grant permissions to applications without a cryptographically verifiable owner, i.e. applications associated with an anonymous owner, then permissions should be granted to all applications for that shared resource. Referring to FIG. 11, the Application Owner Principal Identifier field in the Application Ticket Header 1108 has the value "All".

If an application does not have a cryptographically verifiable owner, the Application Owner Principal Type field in the Application Ticket Header 1108 in FIG. 11 may have the value "Constant", and the Application Owner Principal Identifier will have the value "All". The application may only access shared resources with access control permissions issued to all owners as described above.

Figure 14:
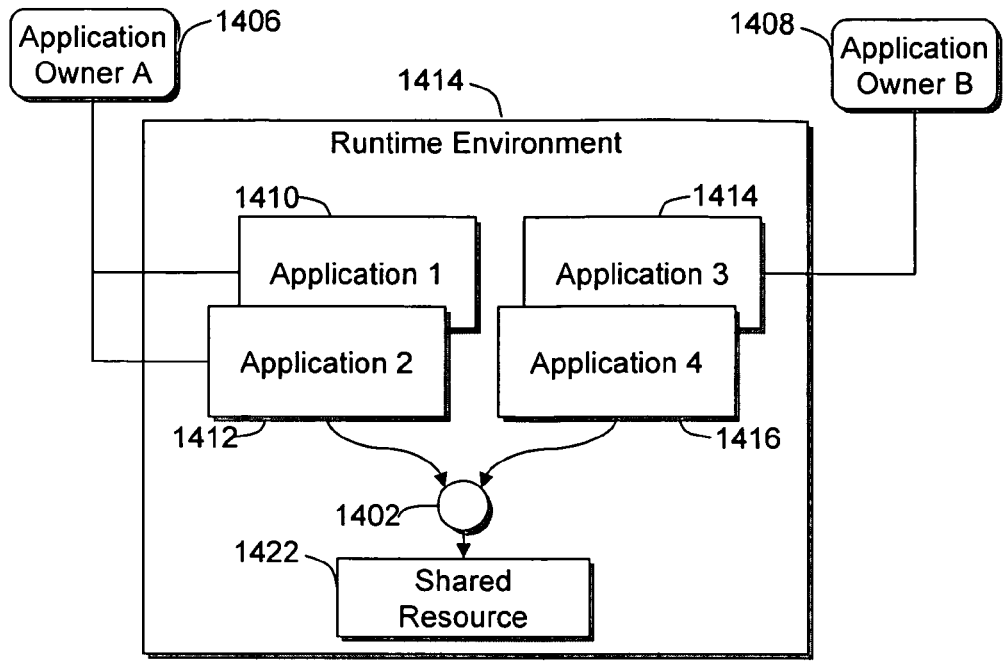
FIG. 14 shows applications with and without application owners accessing a shared resource.

FIG. 14 shows three applications 1410, 1412, 1414 with application owners 1406, 1408 and an application 1416 without application owner accessing 1402 a shared resource 1422 in a runtime environment 1414.

Figure 15:
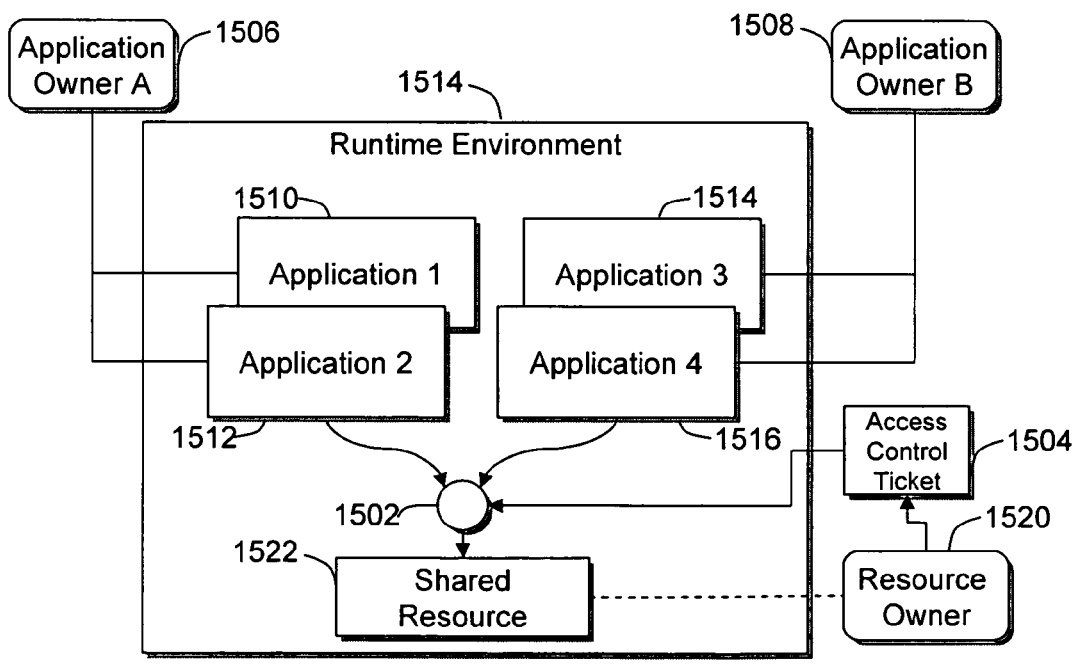
FIG. 15 illustrates an example where permissions are granted to all application owners.

FIG. 15 illustrates an example where permissions 1502, derived from the access control ticket 1504 are granted to all application owners 1506 and 1508 for all applications 1510, 1512, 1514 and 1516 in the runtime environment 1514. In this example, the application is protected since the identify of the shared resource is verified. Also referring to FIG. 11, the Application Identifier field in Application Ticket 1106 is set to "All". The access control ticket 1504 is created by the resource owner 1520 of the shared resource 1522.

Figure 16:
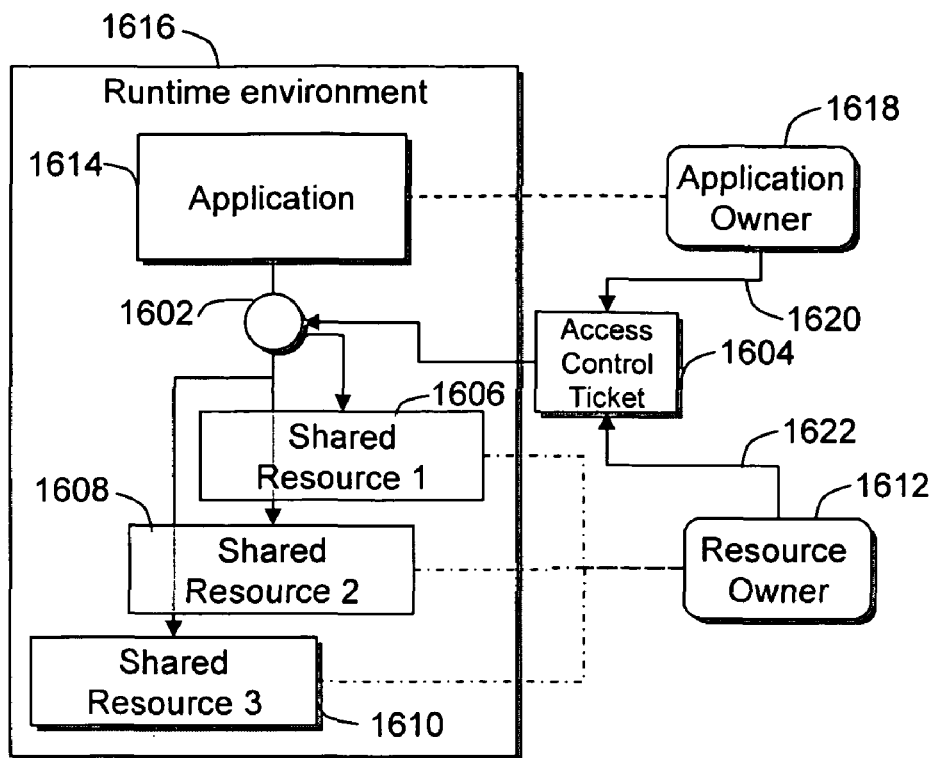
FIG. 16 illustrates an example where permissions are granted to all shared resources.

FIG. 16 illustrates another example where permissions 1602, derived from the access control ticket 1604, are granted to all shared resources 1606,1608 and 1610 owned by a single shared resource owner 1612 to the application 1614 in the runtime environment 1616. The application is owned by the application owner 1618, who may request 1620 to access the shared resource 1610. The access control ticket 1604 is created and approved 1622 by the resource owner 1612 of the shared resource 1610. Referring to FIG. 11, the Shared Resource Identifier field in Shared Resource Permission field 1110 is set to "All".

Figure 17:
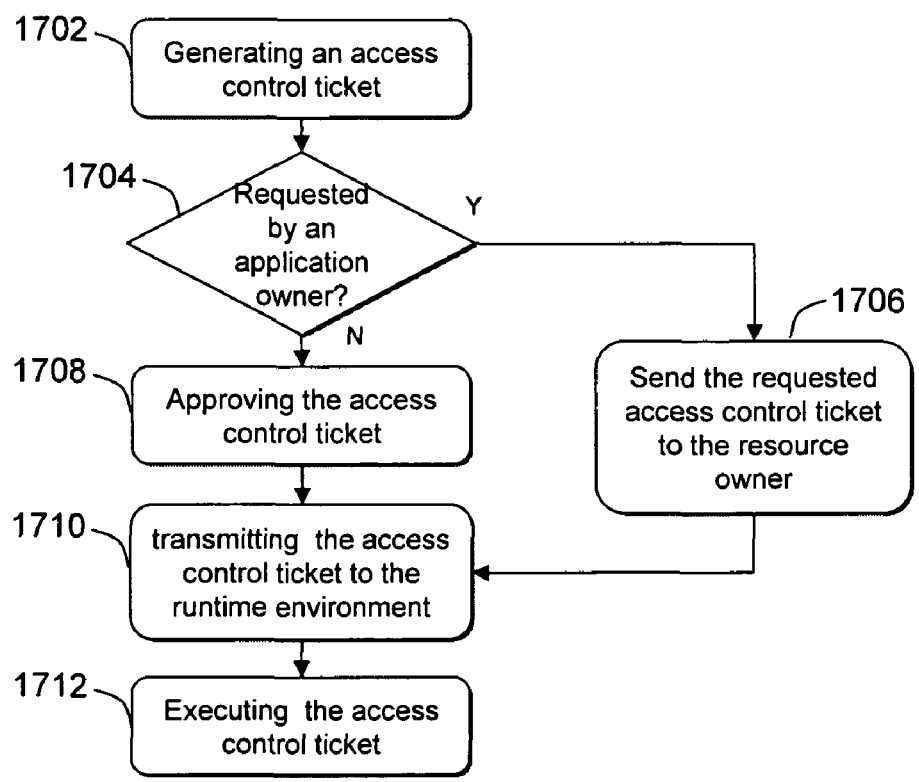
FIG. 17 shows steps of an exemplary method for approving an access control ticket.

FIG. 17 shows steps of a method in accordance with one embodiment of the present patent disclosure. An access control ticket including a permission for the resource, an owner identifier identifying a remote resource owner and another owner identifier identifying the application owner is generated 1702, if the ticket is requested by an application owner 1704, the requested access control ticket is sent to the shared resource owner 1706 for approval. Otherwise the access control ticket is created and approved by the owner of the shared resource 1708 and transmitted to the runtime environment 1710 and executed 1712.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage device for execution by a programmable processor; and method actions within the scope of the present patent disclosure can be performed by a programmable processor executing a program of instructions to perform functions of the patent disclosure by operating on input data and generating output. Embodiments within the scope of the present patent disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). While particular embodiments of the present patent disclosure have been shown and described, changes and modifications may be made to such embodiments without departing from the true scope of the patent disclosure.

What is claimed is:

1. A method for controlling access to a resource, the method comprising the steps of:
   providing a runtime environment on a wireless device, the runtime environment having an application and a shared resource, the shared resource comprising a non-executable component owned by a remote resource owner remote from the wireless device;
   receiving in the runtime environment an access control ticket approved by the remote resource owner, the access control ticket including a permission for the shared resource, a first cryptographically verifiable owner identifier identifying the remote resource owner and a second cryptographically verifiable owner identifier identifying the application owner, wherein the access control ticket is received by the wireless device from outside of the runtime environment;
   signing the shared resource or the application with a private key, resulting in a signature verifiable with a public key corresponding to the private key; and
   executing the application in the runtime environment resulting in a process, the process accessing the shared resource based on the permission.

2. The method of claim 1, wherein the first cryptographically verifiable owner identifier or the second cryptographically verifiable owner identifier is the public key or an X509 name.

3. The method of claim 2, wherein the public key or the X509 name is associated and attested by a certificate.

4. The method of claim 1, wherein the access control ticket further includes a first identifier identifying the shared resource in the runtime environment, and a second identifier identifying the application in the runtime environment.

5. The method of claim 4, wherein the first identifier is a URI or a hash value of the shared resource.

6. The method of claim 4, wherein the second identifier is a URI or a hash value of the application.

7. The method of claim 1, wherein the access control ticket is created by an owner of the application and approved by the remote resource owner.

8. The method of claim 1, wherein the access control ticket is created by an owner of the shared resource and approved by the resource owner.

9. The method of claim 1, wherein the application owner is a remote application owner.

10. The method of claim 1, wherein the access control ticket is sent through an unsecured link from the remote resource owner to the runtime environment.

11. The method of claim 1, further comprising the step of providing the access control ticket to a plurality of runtime environments having the shared resource.

12. The method of claim 1, wherein the first owner identifier or the second owner identifier is anonymous, further comprising the step of granting permission to all applications.

13. The method of claim 1, wherein the access control ticket is included with the application or the shared resource.

14. A wireless device comprising:
   a runtime environment, the runtime environment having an application and a shared resource, the shared resource comprising a non-executable component owned by a remote resource owner remote from the wireless device;
   a module receiving an access control ticket, the access control ticket including a permission for the shared resource, a first cryptographically verifiable owner identifier identifying the remote resource owner and a second cryptographically verifiable owner identifier identifying the application owner; the access control ticket approved by the remote resource owner, wherein the access control ticket is received by the wireless device from outside of the runtime environment; and
   a module executing the application in the runtime environment resulting in a process, the process accessing the shared resource based on the permission,
   wherein the shared resource or the application is signed with a private key, resulting in a signature verifiable with a public key corresponding to the private key and wherein the access control ticket is signed.

15. The wireless device of claim 14, wherein the first cryptographically verifiable owner identifier or the second cryptographically verifiable owner identifier is the public key or an X509 name.

16. The wireless device of claim 15, wherein the public key or the X509 name is associated and attested by a certificate.

17. The wireless device of claim 14, wherein the access control ticket further includes a first identifier identifying the shared resource in the runtime environment, and a second identifier identifying the application in the runtime environment.

18. The wireless device of claim 17, wherein the first identifier is a URI or a hash value of the shared resource.

19. The wireless device of claim 17, wherein the second identifier is a URI or a hash value of the application.

20. The wireless device of claim 14, wherein the access control ticket is created by an owner of the application and approved by the remote resource owner.

21. The wireless device of claim 14, wherein the access control ticket is created by an owner of the shared resource and approved by the resource owner.

22. The wireless device of claim 14, wherein the application owner is a remote application owner.

23. The wireless device of claim 14, wherein the access control ticket is sent through an unsecured link from the remote resource owner to the runtime environment.

24. The wireless device of claim 14, wherein the access control ticket is provided to a plurality of runtime environments having the shared resource.

25. The wireless device of claim 14, wherein the first owner identifier or the second owner identifier is anonymous, and the permission is granted to all applications.

* * * * *